(12) United States Patent
Miyamoto et al.

(10) Patent No.: US 12,160,653 B2
(45) Date of Patent: Dec. 3, 2024

(54) OBJECT RECOGNITION SYSTEM, AND OBJECT RECOGNITION METHOD

(71) Applicants: MEIJI UNIVERSITY, Tokyo (JP); SHINSEI PRINTING CO., LTD., Sakai (JP); DIGITAL PRINTING & SOLUTIONS CO., LTD., Osaka (JP)

(72) Inventors: Ryusuke Miyamoto, Kanagawa (JP); Motoki Takematsu, Kanagawa (JP); Shiho Hanashiro, Kanagawa (JP); Masakazu Kinosada, Osaka (JP); Yujiro Kitaide, Osaka (JP); Koji Gakuta, Osaka (JP); Etsuji Yamada, Osaka (JP); Aoi Kariya, Osaka (JP)

(73) Assignees: MEIJI UNIVERSITY, Tokyo (JP); SHINSEI PRINTING CO., LTD., Sakai (JP); DIGITAL PRINTING & SOLUTIONS CO., LTD., Osaka (JP)

(*) Notice: Subject to any disclaimer, the term of this patent is extended or adjusted under 35 U.S.C. 154(b) by 0 days.

(21) Appl. No.: 18/573,636

(22) PCT Filed: Nov. 30, 2022

(86) PCT No.: PCT/JP2022/044134
§ 371 (c)(1),
(2) Date: Dec. 22, 2023

(87) PCT Pub. No.: WO2023/120070
PCT Pub. Date: Jun. 29, 2023

(65) Prior Publication Data
US 2024/0267608 A1 Aug. 8, 2024

(30) Foreign Application Priority Data
Dec. 24, 2021 (JP) ................. 2021-210042

(51) Int. Cl.
*G06K 9/00* (2022.01)
*G06T 19/20* (2011.01)
(Continued)

(52) U.S. Cl.
CPC ............. *H04N 23/61* (2023.01); *G06T 19/20* (2013.01); *G06V 10/44* (2022.01); *H04N 23/64* (2023.01);
(Continued)

(58) Field of Classification Search
CPC .......... G06F 3/013; G06F 3/017; G06F 1/163; G06F 3/005; G06F 3/011; G06F 3/03547;
(Continued)

(56) References Cited

U.S. PATENT DOCUMENTS 10,726,630 B1   7/2020  Duckworth et al.
2004/0240567 A1* 12/2004 Akita ................... H04L 25/063
                                                    375/259
(Continued)

FOREIGN PATENT DOCUMENTS

CN   103109307 A   5/2013
CN   110378303 A   10/2019
(Continued)

OTHER PUBLICATIONS

International Search Report issued in International Application No. PCT/JP2022/044134, Jan. 24, 2023, 5 pages w/ translation.
(Continued)

*Primary Examiner* — Alex Kok S Liew
(74) *Attorney, Agent, or Firm* — Merchant & Gould P.C.

(57) ABSTRACT a novel object recognition system can be provided that can more appropriately specify objects even when similar objects are assumed.
An object recognition system to estimate which of registered objects registered in a database is a target object in an object image captured by a user comprising:
(Continued)

an acquisition means that obtains the object image;
a registration means that registers an appearance image or that feature value as an appearance information for each of the registered object regarding multiple appearance images representing an appearance of a single object as seen from different feature angles; and
an estimation means that estimates which of the registered objects the target object is, based on the object image and the appearance information.

9 Claims, 7 Drawing Sheets

(51) Int. Cl.
*G06V 10/44* (2022.01)
*H04N 23/60* (2023.01)
*H04N 23/61* (2023.01)

(52) U.S. Cl.
CPC .. *G06T 2219/2016* (2013.01); *G06V 2201/07* (2022.01)

(58) Field of Classification Search
CPC ....... G06F 3/04842; G06F 2203/04806; G06F 3/04815; G06F 3/04845; G06F 3/0485; G06F 13/00; G06F 3/012; G06V 40/161; G06V 20/20; G06V 10/245; G06V 10/44; G06V 2201/06; G06V 40/166; G06V 40/172; G06V 10/24; G06V 10/147; G06V 20/46

See application file for complete search history.

(56) References Cited

U.S. PATENT DOCUMENTS

| | | | |
|---|---|---|---|
| 2009/0322894 A1* | 12/2009 | Abe | G06F 18/28 348/E5.022 |
| 2011/0314049 A1 | 12/2011 | Poirier et al. | |
| 2013/0039569 A1 | 2/2013 | Kashiwagi et al. | |
| 2016/0180509 A1 | 6/2016 | Sato | |
| 2018/0260965 A1* | 9/2018 | Hanocka | G06T 7/32 |
| 2021/0027061 A1 | 1/2021 | Xu et al. | |
| 2022/0133198 A1* | 5/2022 | Popov | A63B 21/00185 73/379.01 |

FOREIGN PATENT DOCUMENTS

| | | |
|---|---|---|
| CN | 113421100 A | 9/2021 |
| JP | 2016-115282 | 6/2016 |
| JP | 2018-142358 | 9/2018 |
| JP | 2018-169752 | 11/2018 |

OTHER PUBLICATIONS

Wengang Zhou et al., "Recent Advance in Content-based Image Retrieval: A Literature Survey", arXiv, Jun. 19, 2017 (Jun. 19, 2017): 1-24.

* cited by examiner

OBJECT INFORMATION

| OBJECT ID | MODEL NUMBER | OBJECT NAME | MANUFACTURE NAME | FEATURE IMAGE ID | PHOTOGRAPHING INSTRUCTION |
|---|---|---|---|---|---|
| 00001 | abc-1234 | DIFFERENTIAL PRESSURE TRANSMITTER (XXXXXX) (XXXX-PRESSURE XXX) | A COMPANY | ... | ... |

OBJECT RECOGNITION SYSTEM, AND OBJECT RECOGNITION METHOD

TECHNICAL FIELD

The present invention relates to object recognition system, and object recognition method that recognize, from an image of an object, which of registered object that is registered in advance that object is.

BACKGROUND ART

For example, regarding an industrial product or that parts, when they are damaged or lost, customer may wish to order again. However, especially for professional products and parts, the customer does not often know name or model number of that product even though he/she has the actual product, and there are many similar products or parts, so that a problem has happened that he/she cannot specify products he/she needs. In particular, recently, many products are sold through the Internet, but when the customers themselves cannot specify a target product, they end up having to visit the store with the actual product for individual consultation, or go through multiple exchanges with the store by attaching images, which has not been sufficiently convenient.

With regard to such a problem, there is a known technology to specify a product registered in a dictionary in advance from an appearance image of product. For example, in Patent Literature 1, a technology is disclosed that recognizes product candidates by obtaining information indicating an appearance of product, extracting multiple that feature values, and comparing with those of each product.

CITATION LIST

Patent Literature

Patent Literature 1: JP2018-142358 A

SUMMARY OF INVENTION

Technical Problem

For example, such as Patent Literature 1, when it is sufficient to select one of the candidates from among target handling products, it can be relatively easy to specify one of the candidate products from an appearance of the product, and even when there are multiple candidates, the product may be appropriately specified by having the user to select one. Particularly when specifying the products and parts that often has similar shapes, however, there has been a problem that they may not be specified because there are many similar objects simply by registering their appearance as seen from one direction.

Thus, the present invention is directed to providing a novel object recognition system that can more appropriately specify objects even when similar objects are assumed.

Solution to Problem

To solve the above-described problem, an object recognition system to estimate which of registered objects registered in a database a target object in an object image captured by a user comprising:
an acquisition means that obtains the object image;
a registration means that registers an appearance image or that feature value as an appearance information for each of the registered object regarding multiple appearance images representing an appearance of a single object as seen from different feature angles;
an estimation means that estimates which of the registered objects the target object is, based on the object image and the appearance information.

With such a configuration, objects can be recognized more accurately based on an appearance image of each object seen from various directions.

In a preferred aspect of the present invention, the registration means comprises means that creates a plurality of the appearance images base on the information indicating three-dimension shape of the registered object, and registers the appearance information based on multiple created appearance images in the database for each of the registered object.

With such a configuration, because the appearance image can be registered based on 3-dimensional shape information, a database of the registered object can be easily created without the need to take numerous appearance images for each registered object.

In a preferred aspect of the present invention, the registration means creates or obtains the appearance image of the registered object with attached object in an appearance, and registers the appearance information based on created appearance image in the database.

With such a configuration, it is possible to register an image obtained by actually taking a picture of an object as the appearance image, and to perform matching by an appearance image similar to an object image obtained by a user.

In a preferred aspect of the present invention, the registration means creates or obtains the appearance image of the registered object with attached object in an appearance, and registers the appearance information based on created appearance image in the database.

When the user actually takes a picture of an object, the object that accompanied by attached objects such as dirty, damage, rust or the like may be a subject. In this way, by registering an appearance image of an appearance with attached object in a database, an effect is expected that appropriate recognition of objects is supported even when there are some attached objects.

In a preferred aspect of the present invention, the registration means registers the appearance information in association with information indicating the feature angle.

With such a configuration, for example, when obtaining information on that shooting angle together with multiple object images from the user, it is possible to specify the object based on changes in the appearance according to the angle, thereby improving more accuracy.

In a preferred aspect of the present invention, the registration means is configured to be able to register a feature image which represents characteristic of an object including information for distinguishing the registered object from other objects in association with registered object,
the estimation means specifies a candidate of the registered object that may be the target object, and creates photographing instruction information for instructing a user to photograph the target object based on the feature image of that registered object.

With such a configuration, for example, by registering an image including a part that has characteristic shapes or unique imprint that is not found on other registered objects as a feature image, it is possible to instruct the user to take a picture so that that part of image is captured. This allows more accurate specification of a target object even when there are multiple similar objects.

In a preferred aspect of the present invention, the estimation means creates photographing instruction information for instructing a user to remove an attached object of the target object when the estimation means cannot specify a candidate of the registered object that may be the target object.

With a such a configuration, even when the appearance is not similar to registered appearance image due to the attached object, by giving appropriate instruction to the user, it is possible to obtain the object image in which an object may be recognized accurately.

In a preferred aspect of the present invention, the estimation means estimates which of the registered object the target object is by using an estimation model has been trained with teacher data that regards the object images as input, and the same registered object as a target object in the object image as output.

With such a configuration, by selecting data set appropriately, it is possible to improve estimation accuracy.

An object recognition program to estimate which of registered objects registered in a database a target object in an object image captured by a user, the program causing a computer to function as:
an acquisition means that obtains the object image;
a registration means that registers an appearance image or that feature value as an appearance information for each of the registered object regarding multiple appearance images representing an appearance of a single object when seen from different feature angles;
an estimation means that estimates which of the registered objects the target object is, based on the object image and the appearance information.

An object recognition method to estimate which of registered objects registered in a database a target object in an object image captured by a user comprising:
an acquisition step that obtains the object image;
a registration step that registers an appearance image or that feature value as an appearance information for each of the registered object regarding multiple appearance images representing an appearance of a single object when seen from different feature angles;
an estimation step that estimates which of the registered objects the target object is, based on the object image and the appearance information.

Advantageous Effects of Invention

According to the present invention, a novel object recognition system can be provided that can more appropriately specify objects even when similar objects are assumed.

BRIEF DESCRIPTION OF DRAWINGS

FIG. 5 illustrates an example of object information stored in a database at the object recognition system for embodiment of the present invention.

DESCRIPTION OF EMBODIMENTS

Figure 1:
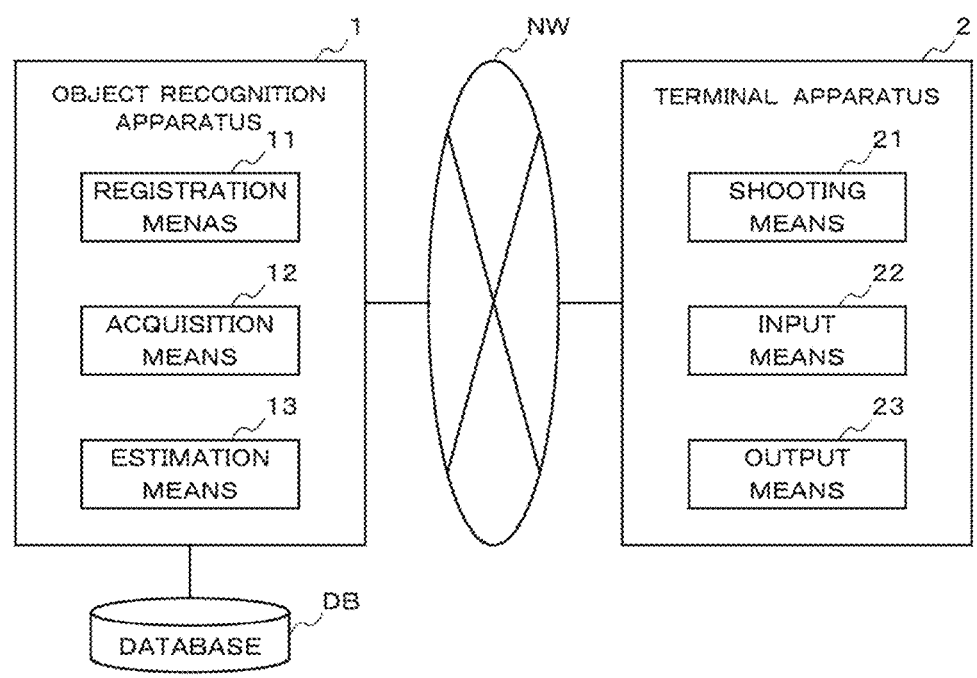
FIG. 1 is a functional block diagram of the object recognition system for embodiment of the present invention.

The following describes the object recognition system of the present invention with diagrams. Note that, the embodiment shown below is an example of the present invention, the present invention is not limited to the following embodiment, and various configurations may be adopted.

For example, although a configuration, an operation or the like of the object recognition system are described in the present embodiment, a method, an apparatus, and a computer program, or the like with a similar configuration may also achieve the same effect. The program may be stored in a recording medium. With this recording medium, for example, the program may be installed on a computer. Here, the recording medium storing the program may be, for example, a non-transitory recoding medium such as CD-ROM or the like.

In the present invention, "object" refers to any object that exists as real object, and is not limited to any subject. In the present embodiment, an industrial product, parts that compose that product, and subassembly that is combination of multiple parts are assumed as the object.

In the present invention, multiple objects are registered in advance together with that appearance, and these registered objects are called "registered objects". The present invention recognizes which of the registered object a target object photographed by the user is, based on that appearance.

In the present invention, an image showing an appearance of the registered object as seen from a particular angle is called appearance image. This particular angle is hereinafter called "feature angle", and in the present embodiment appearance information indicating the appearance image or a feature value obtained from the appearance image are stored in a database in association with the feature angle for each of the appearance image. A plurality of the appearance information of the appearance images, each associated with a different feature angle, is stored for each of the registered object, which makes it possible to recognize objects based on the appearance.

In the following, the present embodiment assumes the appearance image itself as the appearance information, and an explanation is simplified by expressing the registration of the appearance information as "registration of the appearance image", but the feature values of the appearance image can also be used instead of the appearance images. Here, a vector value obtained by calculation based on pixel values of the appearance image can be used as the feature values. It is preferable to use information that combines local and global features of an image as the feature values. The feature values to be used may be determined by a machine learning. For example, it is assumed that a neural network model is trained with tasks of identifying object type from the captured image of the object, and the model is made to extract feature values, and the feature values to be used is determined so that identification accuracy gets higher.

Note that, regarding the same registered object, multiple appearance images may be registered for the same feature angle. For example, in the present embodiment, multiple appearance images with attached objects such as rust, dirt, or scratches, and the appearance image without such attached objects are registered tied to the object information of the same registered object as the appearance image corresponded to the same feature angle. In the present invention, the appearance information is not necessarily registered corresponding to the feature angle, the object information may be registered tied to the appearance images.

Referring to FIG. 1, the functional configuration of the object recognition system for the present embodiment is described. The object recognition system in the present embodiment is composed by the object recognition apparatus 1 and a terminal apparatus 2, which are communicable via network NW, the object recognition apparatus 1 is connected to the database DB by wire or wirelessly. The object recognition apparatus 1 receives the object image captured by the user from the terminal apparatus 2, and by executing a recognition process, recognizes which of the registered object registered in the database DB the target object included in the object image is.

As the object recognition apparatus 1, a general computer apparatus such as server device may be used that comprises an arithmetic device such as CPU (Central Process Unit) and GPU (Graphics Processing Unit) or the like, a main storage such as RAM (Random Access Memory) or the like, an auxiliary storage such as HDD (Hard Disk Drive), SSD (Solid State Drive), and a flash memory or the like, and various input and output devices or the like including means for connecting to the network. Multiple computers may compose the object recognition apparatus 1.

As the terminal apparatus 2, any computer apparatus such as a smartphone or a tablet type terminal can be used that comprises a camera, the arithmetic device, the storage device and various input and output devices or the like including means for connecting to the network. A dedicated application for transmitting the object image to the object recognition apparatus 1, and a browser application for accessing a dedicated webpage or other application are stored in the storage device, and by the arithmetic device executing various process, any computer apparatus functions as the terminal apparatus 2 in the present invention.

Note that in the present embodiment, the object images are transmitted to the object recognition apparatus 1 via the network NW by using a computer with a camera as the terminal apparatus 2, but for example, it may be configured that the object images are directly transmitted from a digital camera or other camera to the object recognition apparatus 1 by wire or wirelessly. Alternatively, the object recognition apparatus 1 may obtain the object images stored in any database or the like in advance.

The object recognition apparatus 1 comprises a registration means 11 that registers the appearance images for each of the registered object, an acquisition means 12 that obtains the object images transmitted from the terminal apparatus 2, and an estimation means 13 that estimates which of the registered object the target object in the object images is. Note that these means may be dispersedly comprised in multiple computers.

The registration means 11 registers the object information for each of the registered object, and registers multiple appearance images in association with the object information. Each of the appearance image shows an appearance of an object as seen from a particular feature angle, and is registered corresponded to the feature angle. In the following, registration examples of the appearance images are described with FIG. 2-FIG. 4.

Figure 2:
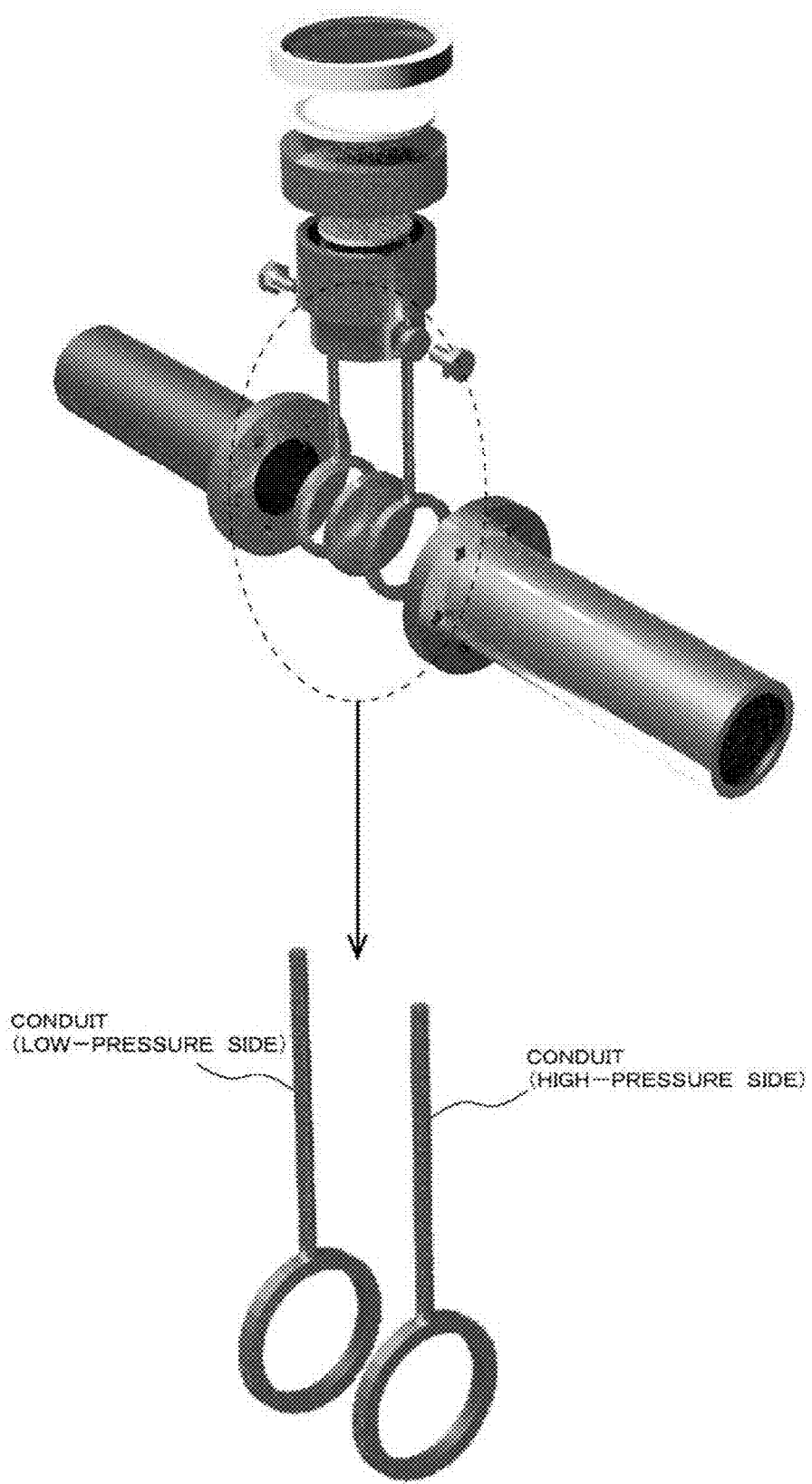
FIG. 2 is an explanatory diagram of an example of an object for embodiment of the present invention.

Here, to describe the registration examples of the appearance images, an example of an object is shown in FIG. 2. As mentioned above, the type of the object is not limited, but here, for example, a differential pressure transmitter as shown in FIG. 2 is assumed as the example. This differential pressure transmitter has a diaphragm between upstream and downstream pipe, measures the difference between upstream and downstream pressure, and measures the flow rate of fluid passing through the pipe. It is assumed that the differential pressure transmitter can be divided into multiple parts as shown in FIG. 2, and in this example, a conduit that is one of the parts comprising the differential pressure transmitter is registered as the registered object.

In this example, there are low pressure side and high pressure side conduit, which makes the conduits distinguishable, but their shapes are very similar, and it is difficult to distinguish them. In this way, when the object such as very similar parts are assumed, the appearance images are registered corresponded to multiple feature angles so that each object can be distinguished. Note that, it is preferable to register multiple appearance images in multiple feature angles, but the appearance images are not necessarily corresponded to the feature angle, and multiple appearance images in different feature angle may be simply registered, respectively.

Figure 3:
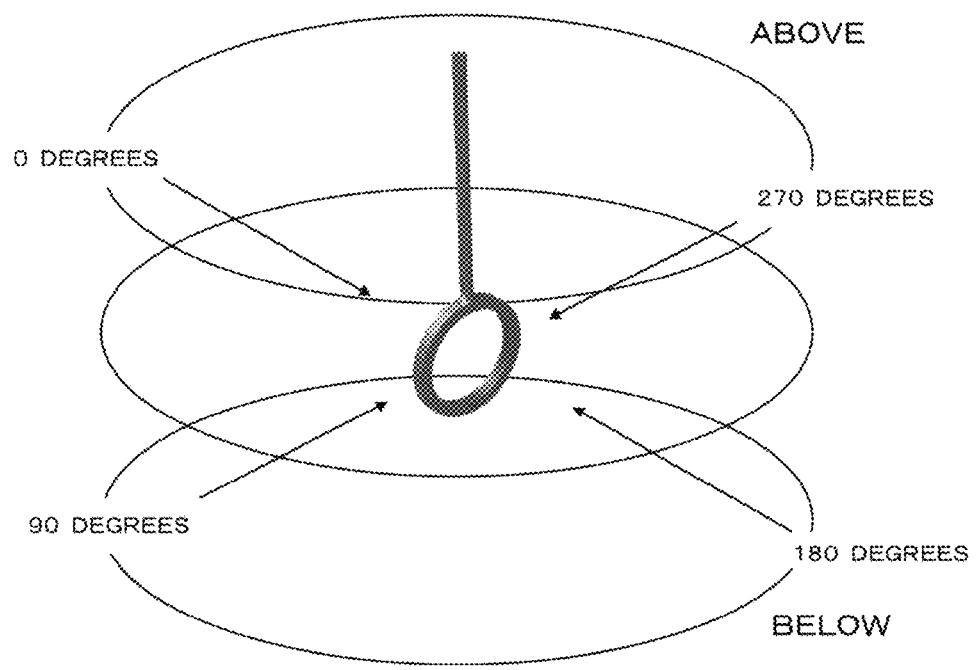
FIG. 3 illustrates a shooting direction of an appearance image of the object recognition system for embodiment of the present invention.

The appearance image can be obtained, for example as shown in FIG. 3, by photographing an object from above, horizontal position, below the object, respectively, while shifting an observation angle (the feature angle) around vertical axis. Here, in acquisition of the appearance images, an object or a camera may actually be moved at each feature angle to capture an actual object, or information indicating 3-dimensional shape are obtained using CG (Computer Graphics) technology, and the appearance image as seen from each feature angle may be created based on it.

Figure 4:
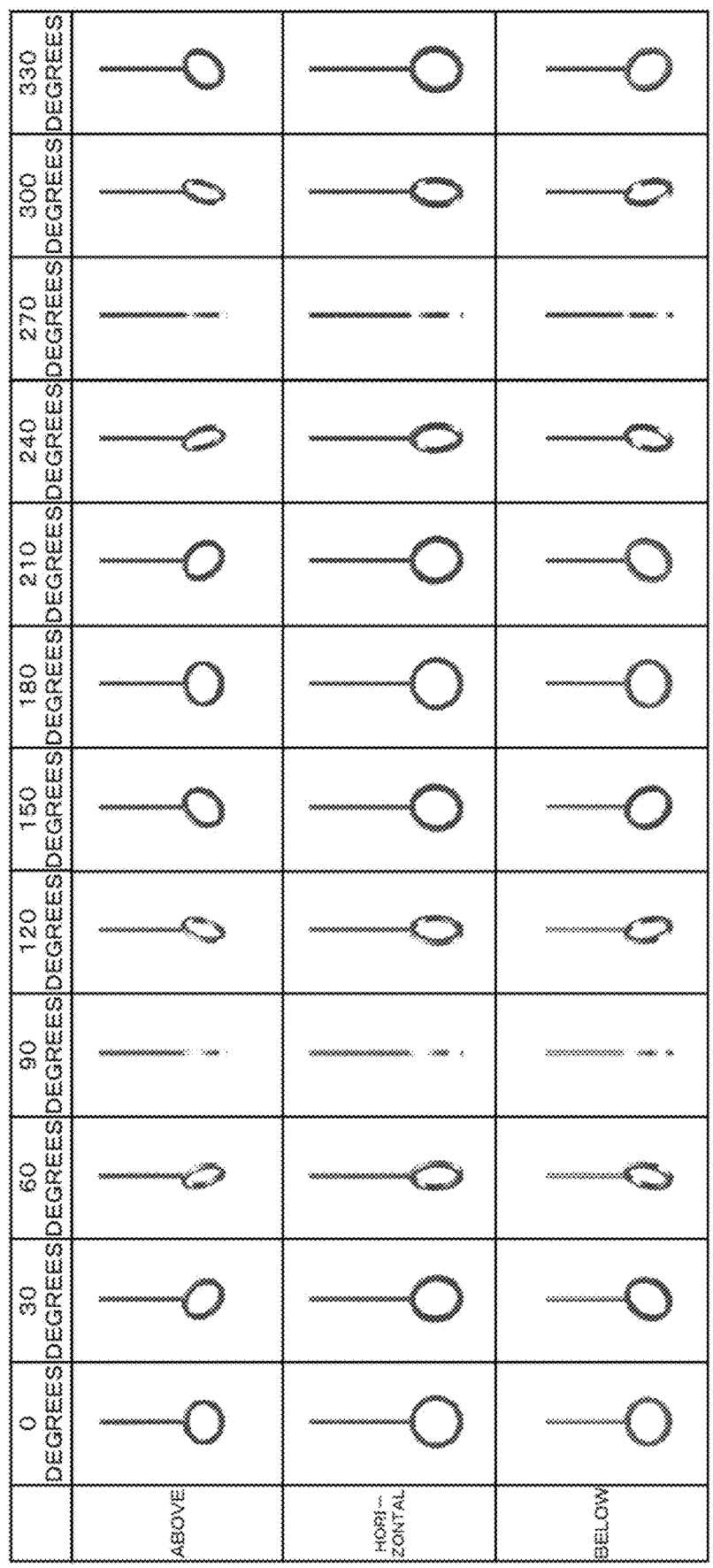
FIG. 4 illustrates a diagram of an example of an appearance image of the object recognition system for embodiment of the present invention.

FIG. 4 shows an example of the appearance images for each of the feature angle obtained in this way. In the present embodiment, images showing each of the appearance is registered as the feature angles in association with horizontal and vertical angle from reference position. Note that, vertical angle is shown here in three steps, which are upward, horizontal, and downward, but regarding this for example, the vertical angle may be shifted in the range of −90 to 90 degrees at predetermined intervals (for example 30 degrees), with horizontal being 0 degrees. The feature angles do not necessarily have to be at regular interval in this way.

In addition, the registration means 11 in the present embodiment registers, separately from the appearance image, the feature image containing information to distinguish the registered object from other objects and tied to the object information. The registration means 11 also registers a part of the appearance image as the feature image containing information to distinguish the registered object from other objects and tied to the object. information. For example, in an example of the conduit shown in FIG. 3, an image of a part in which different characters are engraved on the low-pressure side and the high-pressure side can be registered as the feature image. In the present embodiment, the registration means 11 also registers the feature image in association with the observation angle in the same way as the feature angle of the appearance image. Here the observation angle of the feature image is an angle at which the registered object is easily distinguished from other similar objects.

The acquisition means obtains the object images captured by terminal apparatus 2. The method of acquiring the object image is not limited, for example, an image captured in advance may be uploaded as the object image, but in the present embodiment, it is assumed that the camera provided by the terminal apparatus 2 is pointed at the target object, the object images are captured at any time and transmitted to the object recognition apparatus 1 each time or at predetermined intervals, and the acquisition means 12 obtains the object images. In the present embodiment, the acquisition means 12 also obtains information on that shooting angle together with the object images.

The estimation means 13 estimates which of the registered object the target object in the object image is, based on the object images obtained by the acquisition means 12 and the appearance image of the registered object registered in the database DB. In the present embodiment, the estimation means 13 estimates which of the registered object the target object is by using an estimation model has been trained with teacher data that refers the object images as input and the registered object identical to the target object in the object image as output. In other words, the estimation means 13 estimates which of the registered object the target object is by entering the object images into the estimation model that has been trained with tasks of estimating the registered object corresponding to the appearance image referring the appearance image as input.

The database DB stores various information such as the object information for each registered object, and the appearance images tied to the object information, or the like. FIG. 5 shows an example of the object information for each of the registered object registered in the database DB. As the object information, an object ID to uniquely identify the registered object, a model number, an object name, a manufacture name, a feature image ID, and photographing instruction are stored. The feature image ID is information that specifies the feature images showing an appearance of important part to especially distinguish the registered object from other similar registered objects. In the present embodiment, in this way, the feature images are registered for each of the registered object.

The feature image is an image that shows an appearance as seen from the shooting direction that is useful for distinguishing from other objects, such as a characteristic shape, an imprint, and a print. For example, an image captured with characteristic part expanded may be used as the feature image. Any of the appearance images corresponded to the feature image may be used as the feature images, but apart from the appearance image, for example, an image that magnifies a specific part of the object rather than the entire object may be used. In other words, the feature images may or may not be corresponded to information indicating the observation angle of the object. The photographing instruction is a statement for prompting the user to photograph a part shown by the feature image, and registered as character strings. Note that, the photographing instruction may be in other formats, such as an illustration (an image) of an arrow indicating the shooting direction.

In this way, the appearance images and the feature images for each of the feature angle are registered in the database DB for each of the registered object. The present invention estimates which of the registered object the target object in the object images is, based on registered information and the object image captured by the user. In the following, a procedure of a process for recognizing an object is described with a flowchart.

Figure 6:
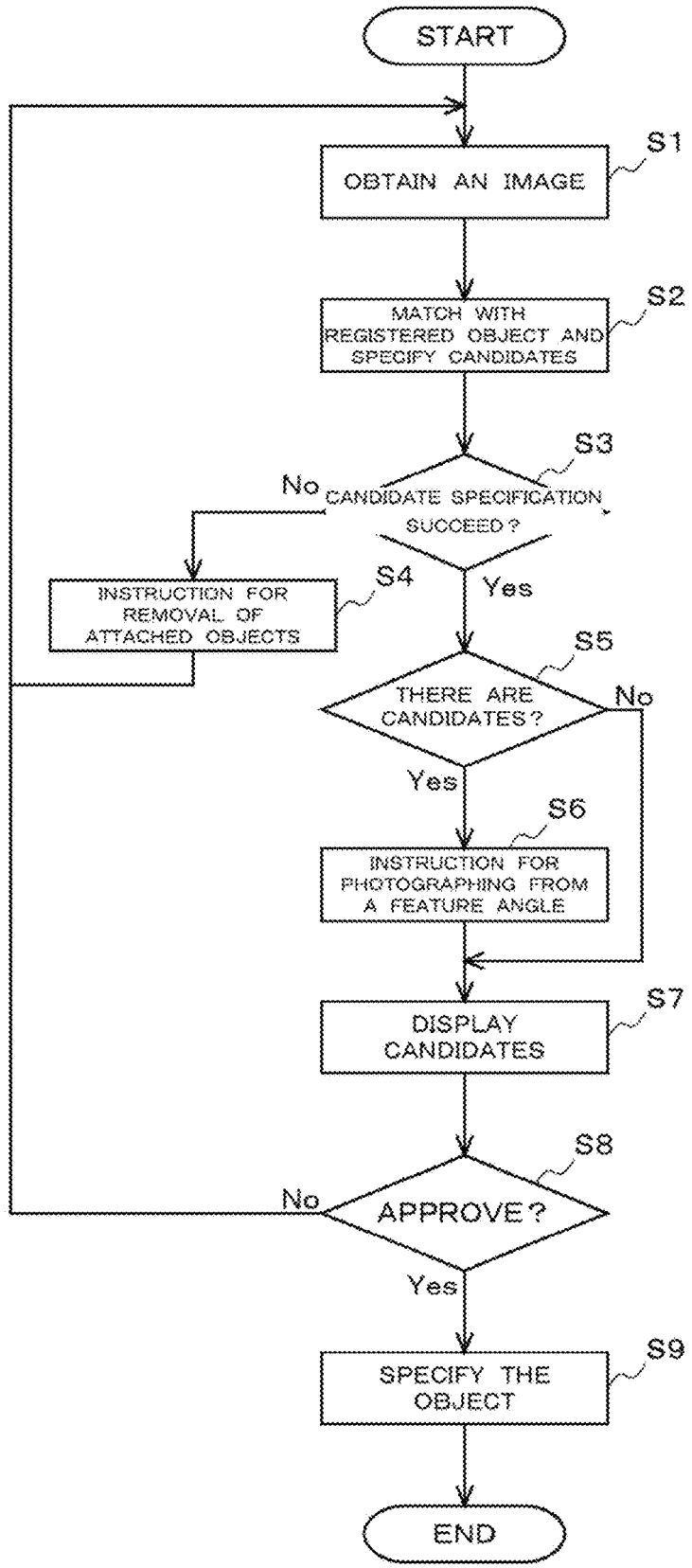
FIG. 6 is a processing flow chart for recognizing an object of the object recognition system for embodiment of the present invention.

FIG. 6 is a flowchart of a recognition processing in the present embodiment. In the present embodiment, a shooting means 21 photographs the target object and creates the object images in the terminal apparatus 2. In the object recognition apparatus 1, first at step S1, the acquisition means 12 obtains the object images transmitted from the terminal apparatus 2. Here in the present embodiment, information on the shooting angle obtained by accelerometer or gyro sensor provided by the terminal apparatus 2 also obtained together with the object image.

Here, in photographing the object image, the shooting means 21 may take a picture by receiving the photographing instruction one by one, but it is preferable that while the user points a camera at the object, the shooting means 21 obtains the object images continuously at any time, and transmits the object images to the object recognition apparatus 1. This allows the acquisition means 12 to obtain multiple object images continuously, and because an estimation processing described below is executed based on it, recognition accuracy improvement effect is expected. The shooting angle also does not need to be obtained as an absolute value for each of object image acquisition, may be obtained by relative change in how much an object has moved and in which direction based on the shooting angle of an object image.

Next at step S2, the estimation means 13 specifies candidates of the target object based on the object image and information registered in the database DB. Specifically, for example, a method is assumed that specifies the candidates of the target object by entering the object image and the information on the shooting angle with the neural network model that has been trained with the task of identifying the object based on the appearance image registered in the database DB and that feature angle.

At step S3, it is determined whether the estimation means 13 has successfully specified the candidates or not. For example, it is conceivable that the probability that the target object is each of the registered object is calculated for each registered object at step S2, and success or failure of candidate specification is determined according to whether or not there is the registered object whose probability exceeds a predetermined value. In this case, when there is no registered object whose probability exceeds the predetermined value, failure of candidate specification is determined, and the process proceeds to step 4.

When the candidates cannot be specified, it is assumed that there may be problem with the object image. For example, it is the case where an appearance, such as a shape, color, or the like of the object has been changed by dirty and rust or other attached object. Thus in the present embodiment, at step S4, the estimation means 13 creates photographing instruction information for instructing the user to remove the attached objects from the target object, and transmits the photographing instruction information to terminal apparatus 2. Then an output based on the photographing instruction information on the terminal apparatus 2 can instruct the user to remove the attached objects. In addition to this, because the object images may be defective due to camera shake when a large movement is detected during the object images capture, the estimation means 13 may create the other photographing instruction information such as "Do not move" to instruct the user not to move for a certain period of time.

When the candidates are successfully specified at step S3, the process proceeds to step S5, and the estimation means 13 checks whether or not there are more candidates. When there are more candidates, the process proceeds to step S6, the estimation means 13 creates the photographing instruction information for instructing the user to photograph the target object based on the feature images in any of the registered objects of specified candidates. The estimation means transmits the created photographing instruction information to the terminal apparatus 2, and an output means 23 provides an output based on the photographing instruction information.

Figure 7:
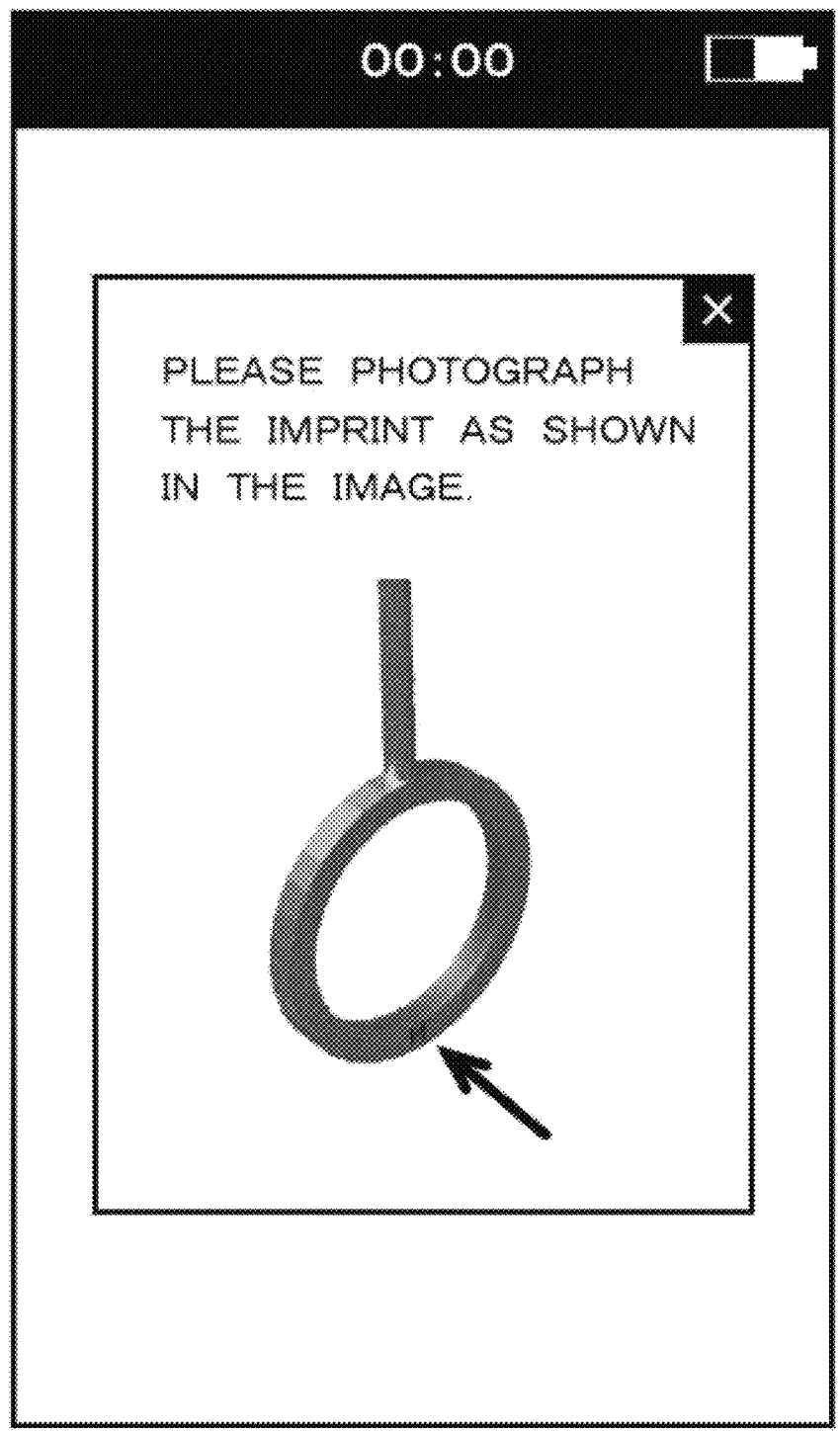
FIG. 7 is a display example of a photographing instruction of the object recognition system for embodiment of the present invention.

FIG. 7 is a display example of an instruction screen displayed based on the photographing instruction information. In the present embodiment, the photographing instruction information is created based on the feature images and the photographing instructions that are included in the object information of any of the candidate specified by the estimation means 13. Here, the feature images are displayed, and together with a statement "Please photograph an imprint such as shown in the image" as the photographing instruction. In addition to this, for example, the feature images may be superimposed on a preview of the captured image, and the user may be instructed to "align the object with the guide" or the like. It may be arbitrarily determined which of the registered object's the feature images and the photographing instructions among the candidates will be used. For example, a method is assumed that uses the object information of the candidate with the higher probability calculated at step S3.

Here, an example is described that the feature images and the photographing instructions are displayed as it is, but in addition to this, the photographing instruction information is created that gives specific instructions for shooting angle or the like. For example, it is assumed that the observation angle of the feature image is registered in the database DB in association with that feature image, and the photographing instruction information is created based on it.

More specifically, first the acquisition means 12 obtains the shooting angle of the object image together with that object image. Then the estimation means 13 compares that shooting angle with the observation angle corresponded to the feature image, and creates the photographing instruction information that gives the specific instruction for amount of movement and direction of movement, namely, how much and in which direction to move from current shooting angle. In this case, for example, a statement such as "Please move 30 degrees to the right to take a picture", or an arrow indicating a direction to move a camera can be displayed as the photographing instruction outputted by the output means 23.

Note that, in this way, the photographing instruction information is created based on the feature images of the specified candidate in the present embodiment, but without using the feature images and that observation angle, the photographing instruction information may be created that simply instructs the user to change the shooting angle, for example "Please photograph from other direction" or "Please rotate the object" or the like.

As mentioned above, in the present embodiment, for keeping to obtain the object image continuously, by the user moving a camera according to the instruction, the recognition is executed again. Here, because the candidates are already narrowed at step S3, the estimation means 13 specifies one of the appropriate registered objects from among those candidates based on the object images and the feature images obtained according to the instruction at step S6, outputs the registered object specified at step S7 to the terminal apparatus 2 as the candidates, and receives approve for recognition result from the user. Note that, without narrowing down the choices, the same processes as step S2-step S5 may be executed for all of the registered objects.

Then, when the user approves the displayed candidate (YES at step S8), the object is specified at step S9, and the process finishes. On the other hand, when the displayed candidate and the captured target object are considered different, the user chooses not to approve (No at step S8), and the recognition process is redone again, returning to step S1.

As described above, according to the object recognition system in the present embodiment, by the user photographing the target object with the terminal apparatus 2, the object can suitably be recognized even when there are similar objects. This makes it possible, for example, to display sales pages on the specified registered object, or to make inquiries based on the registered object, then even when the user does not know a model number of the target object him/herself, the user can easily order the object, repair it, and contact a manufacture.

Specifically, it is assumed that the present invention is applied to a product mail order page, and after an object specified, a purchase button for adding the specified registered object to shopping basket is displayed. This allows the user to easily purchase an exact product even when a model number of the object at hand is unknown. In addition, for example, it is assumed that the present invention is applied to a website provided by a product manufacture, after an object specified, a manual display button for displaying a link of manual group of the specified registered object. The manual group may include repair instructions, operating manuals, installation manuals, specifications.

Note that, in the above application example, when an object is a part of a product and cannot be purchased separately, or when there is no manual for the part itself, the object information may be tied to that product, and the purchase button or the manual button for the product corresponding to the tied product may be displayed.

REFERENCE SIGNS LIST

1: object recognition apparatus
2: terminal apparatus
11: registration means
12: acquisition means
13: estimation means
21: shooting means
22: input means
23: output means
DB: database
NW: network

The invention claimed is:
1. An object recognition system to estimate which of a plurality of registered objects a target object in an object image is, wherein the plurality of registered objects are registered in a database and the object image is captured by a user, the object recognition system comprising:
an acquisition means that obtains the object image;
a registration means that registers an appearance image or a feature value as an appearance information for each of the plurality of registered objects regarding multiple appearance images representing an appearance of a single object as seen from different feature angles, and registers a feature image showing a useful part for distinguishing the registered object from other objects of the plurality of registered objects, and a photographing instruction to prompt a user to photograph the useful part shown in the feature image in the database for each registered object of the plurality of registered objects; and
an estimation means that estimates which of the plurality of registered objects the target object is, based on the object image and the appearance information associated with each of the plurality of registered objects, specifies candidates from the plurality of registered objects that may be the target object based on the feature image and the photographing instruction, and creates photographing instruction information that gives a user an instruction on photographing for specifying the target object out of the candidates from the plurality of registered objects.

2. The object recognition system according to claim 1, wherein the registration means comprises means that rotates a three-dimension model of a registered object of the plurality of registered objects, creates a plurality of the appearance images observed from each feature angle, and registers the appearance information based on multiple created appearance images in the database the registered object.

3. The object recognition system according to claim 1, wherein the registration means comprises means that obtains an image of a registered object of the plurality of registered objects, and registers the appearance information in the database regarding that image as the appearance image.

4. The object recognition system according to claim 1, wherein the registration means creates or obtains the appearance image of a registered object of the plurality of registered objects with an attached object in an appearance, and registers the appearance information based on a created appearance image in the database.

5. The object recognition system according to claim 1, wherein the registration means registers the appearance information in association with information indicating the feature angle.

6. The object recognition system according to claim 1, wherein the estimation means creates photographing instruction information for instructing a user to remove an attached object of the target object when the estimation means cannot specify a candidate from the plurality of registered objects that may be the target object.

7. The object recognition system according to claim 1, wherein the estimation means estimates which of the plurality of registered objects the target object is by using an estimation model trained with teacher data that regards the object images as input, and the same registered object as a target object in the object image as output.

8. An object recognition method to estimate which of a plurality of registered objects a target object in an object image is, wherein the plurality of registered objects are registered in a database and the object image is captured by a user, the object recognition method comprising:
an acquisition step that obtains the object image;
a registration step that registers an appearance image or a feature value as an appearance information for each of the plurality of registered objects regarding multiple appearance images representing an appearance of a single object when seen from different feature angles, and registers a feature image showing a useful part for distinguishing the registered object from other objects of the plurality of registered objects, and a photographing instruction to prompt a user to photograph the useful part shown in the feature image in the database for each registered object of the plurality of registered objects; and
an estimation step that estimates which of the plurality of registered objects the target object is, based on the object image and the appearance information associated with each of the plurality of registered objects, specifies candidates from the plurality of registered objects that may be the target object based on the feature image and the photographing instruction, and creates photographing instruction information that gives a user an instruction on photographing for specifying the target object out of the candidates from the plurality of registered objects.

9. An object recognition system to estimate which of registered objects registered in a database a target object in an object image captured by a user comprising:
an acquisition means that obtains the object image;
a registration means that registers an appearance image or that feature value as an appearance information for each of the registered object regarding multiple appearance images representing an appearance of a single object as seen from different feature angles, and registers the feature image showing a useful part for distinguishing the registered object from other objects, and a photographing instruction to prompt a user to photograph the part shown in the feature image in the database for each registered object; and
an estimation means that estimates which of the registered objects the target object is, based on the object image and the appearance information, specifies candidates of the registered object that may be the target object, and creates photographing instruction information for giving a user an instruction on photographing the target object;
wherein the estimation means creates photographing instruction information for instructing a user to remove an attached object of the target object when the estimation means cannot specify a candidate of the registered object that may be the target object.

* * * * *